(No Model.)

W. H. THOMAS & C. B. CORE.
BILLIARD CUE TIP.

No. 296,087. Patented Apr. 1, 1884.

WITNESSES:
Theo. G. Hoster
C. Sedgwick

INVENTOR:
W. H. Thomas
C. B. Core
BY Munn & Co
ATTORNEYS.

United States Patent Office.

WARREN H. THOMAS AND CHARLES B. CORE, OF PEORIA, ILLINOIS.

BILLIARD-CUE TIP.

SPECIFICATION forming part of Letters Patent No. 296,087, dated April 1, 1884.

Application filed October 26, 1883. (No model.)

*To all whom it may concern:*

Be it known that we, WARREN H. THOMAS and CHARLES B. CORE, both of Peoria, in the county of Peoria and State of Illinois, have invented a new and Improved Billiard-Cue Tip, of which the following is a full, clear, and exact description.

The object of our invention is to provide a new and improved tip for billiard-cues, which tip can be securely fastened very readily and in an accurate and true position on the end of the cue.

The invention consists in the combination, with a cue, of a screw screwed in the end of the same, and in a butt-piece held on the end of the cue by the screw, on which butt-piece a tip is secured.

The invention also consists in providing the screw with a taper toward each end, and in providing the butt-piece with a neck fitting in a cavity or recess in the end of the cue.

Reference is to be had to the accompanying drawings, forming part of this specification, in which similar letters of reference indicate corresponding parts in both the figures.

Figure 1:
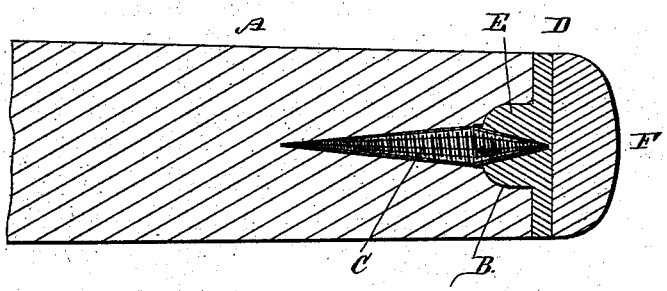
Figure 2:
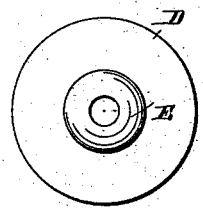

Figure 1 is a longitudinal sectional elevation of the tip end of a cue provided with my improved tip. Fig. 2 is a face view of the under side of the butt-piece.

In the end of the cue A an aperture or cavity, B, is formed, which is provided with a concave bottom. A screw, C, tapered toward both ends, has one taper about one-third of the length of the other, and is screwed into the end of the cue at the middle of the cavity in the end of the cue in such manner that the short taper projects from the middle of the base of the cavity, the long taper being screwed into the end of the cue. A butt-piece, D, of the same diameter as the end of the cue, is provided on its inner or under side with a neck, E, fitting in the recess or cavity B, into which neck the short taper of the screw C is screwed, thereby holding the butt-piece on the end of the cue. The tip F is then glued on the front surface of the butt-piece. As the bottom of the cavity or recess B is made concave, the leather, in shrinking, forces itself against the short taper of the screw, and thus binds firmly on the screw and cannot become detached. The tip can thus be adjusted on the cue very readily and accurately, and in such a manner that the tip cannot be knocked off, and it gives the cue a neat finish.

The butt-piece and the tip are made of leather or other suitable material.

Having thus described our invention, we claim as new and desire to secure by Letters Patent—

1. The combination, with a cue, of a screw tapered toward both ends and screwed in the end of the cue, a butt-piece held on the end of the cue by the screw, and of a tip glued on the butt-piece, substantially as herein shown and described.

2. The combination, with a cue having a recess in its end, of a screw screwed in the end of the cue and projecting through the cavity, a butt-piece held on the projecting end of the screw, and provided with a neck fitting in the cavity in the end of the cue, and of a tip secured on the butt-piece, substantially as herein shown and described.

3. The combination, with a cue provided in its end with a cavity having a concave bottom, of a screw screwed in the end of the cue and projecting through the cavity, a butt-piece held on the projecting end of the screw, and provided with a neck fitting in the cavity, and of a tip secured on the butt-piece, substantially as herein shown and described.

WARREN H. THOMAS.
CHARLES B. CORE.

Witnesses:
W. F. FAHNESTOCK,
W. H. BANDY.